J. W. HOBING.
FUEL VALVE.
APPLICATION FILED SEPT. 25, 1916.
1,227,616.
Patented May 29, 1917.
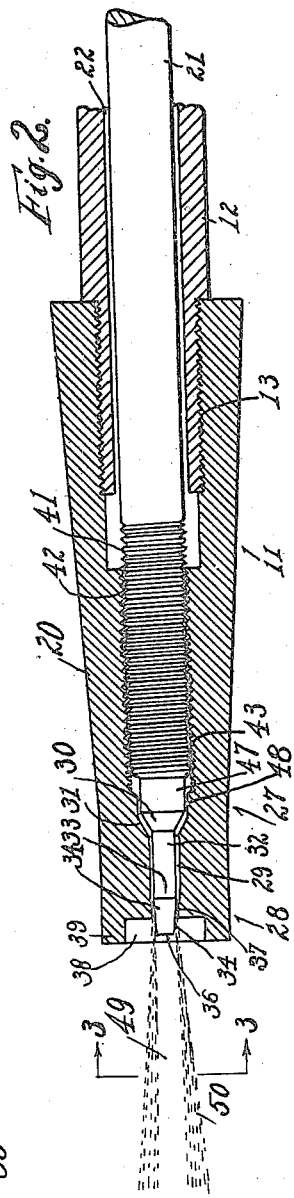
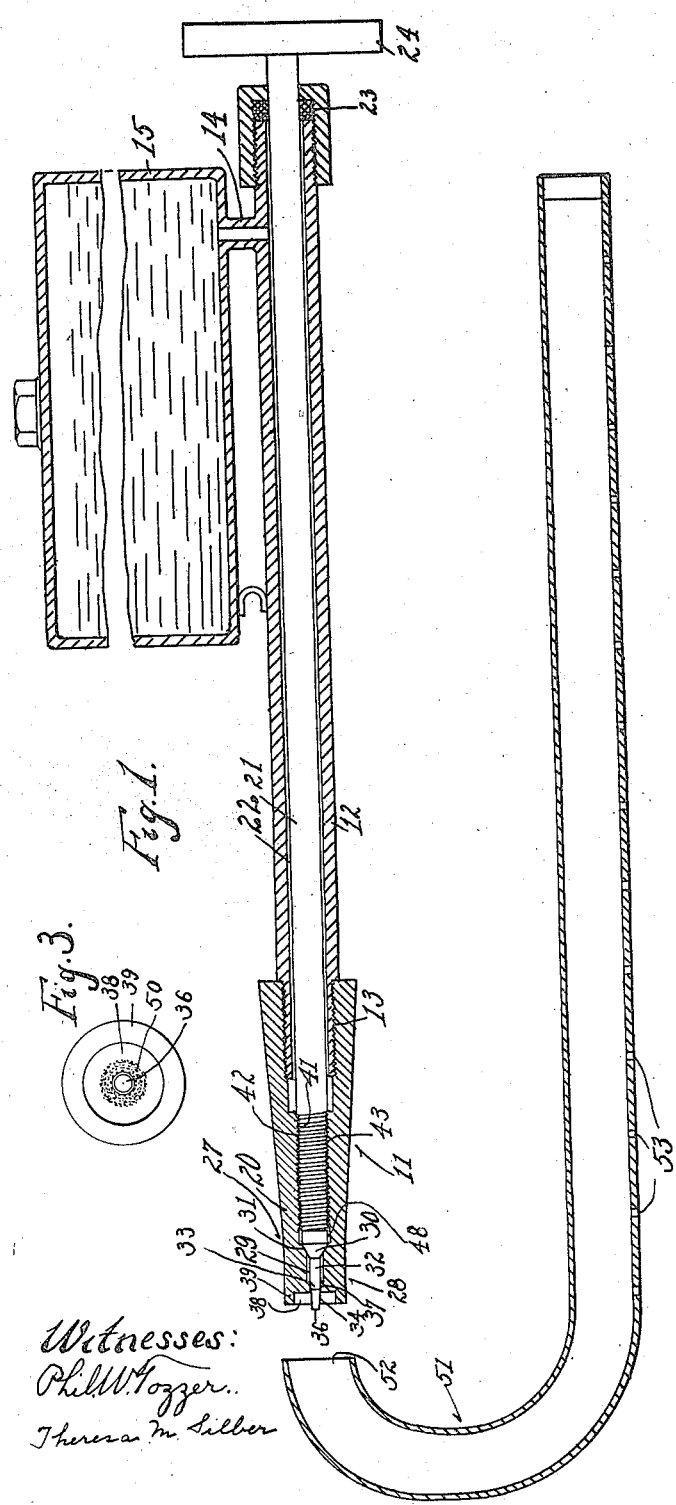

UNITED STATES PATENT OFFICE.

JOHN W. HOBING, OF CINCINNATI, OHIO.

FUEL-VALVE.

1,227,616.

Specification of Letters Patent.   Patented May 29, 1917.

Application filed September 25, 1916.  Serial No. 121,980.

*To all whom it may concern:*

Be it known that I, JOHN W. HOBING, a citizen of the United States, residing at Cincinnati, in the county of Hamilton and State of Ohio, have invented certain new and useful Improvements in Fuel-Valves, of which the following is a specification.

It is the object of my invention to provide a fuel-valve especially adapted for discharging a hollow stream of liquid or gaseous fuel, and the invention will be further readily understood from the following description and claims, and from the drawing, in which latter:

Figure 1 is an axial section of my improved device, shown in connection with a fuel-mixer and burner-tube.

Fig. 2 is an enlarged axial section showing the valve adjustment and illustrating the operation of the valve; and, Fig. 3 is a cross-section on the line 3—3 of Fig. 2.

I have exemplified my invention as employed in connection with a liquid fuel, although it is obvious that the same may be employed in connection with gaseous fuel, if desired.

The valve is represented at 11 and is shown as having a fuel-pipe 12 connecting therewith, as by means of a threaded joint 13. The fuel-pipe is arranged to receive its fuel in suitable manner, as from a feed-pipe 14 communicating with a suitable fuel-tank 15 for containing the fuel, such as gasolene, alcohol, or similar fuel.

The valve comprises a valve-casing 20. 21 is a valve-stem which is shown extending through the fuel-pipe, there being a fuel-passage 22 surrounding said stem between said stem and the inner wall of the fuel-pipe. A compressible gasket-packing 23 between the pipe and stem closes one end of said passage and acts to hold the stem in adjusted positions. A turning-part 24, shown as a thumb-wheel, is fixed to the outwardly projecting end of the valve-stem.

The valve comprises a shut-off valve 27 and a regulating valve 28 having a fuel-space 29 therebetween. The valve-stem has a valve-closure 30 thereon which coacts with the valve-seat 31 in the valve-casing for forming the shut-off valve.

The regulating valve comprises a regulating shank 32 having thereon a cylindrical portion 33 from which a slightly tapering portion 34 projects, the slightly tapering portion terminating in a blunt end 36, which forms a sharp angle with the tapering portion of the shank. The shank 32 coacts with a cylindrical bore 37 in the end of the valve-casing. The tapering portion 34 of the regulating shank 32 is arranged to be moved to greater or less extent into the fuel-space 29 and coacts with the cylindrical bore 37 to regulate the flow of fuel through the regulating valve.

The cylindrical bore or aperture opens into a recess 38 in the end of the valve-casing, an annular bead 39 surrounding said recess. The regulating shank coacts with the cylindrical bore and projects into said cavity, the outer end of said shank extending outwardly beyond said bore when discharging fuel. When the valve-stem is moved axially the space between said regulating shank and the wall of the bore is increased or decreased for regulating the flow of gas or fuel past the outer end of the regulating shank.

The construction is such that the fuel emitted from the valve assumes a hollow form, as a tube of fuel, whereby the outside dimensions of a given volume of emitted fuel is increased so as to contact a greater volume of air, whereby a large amount of air in proportion to the volume of fuel is mixed with the fuel for providing a fuel-mixture having a maximum amount of air per fuel unit for providing a high-grade mixture, which will burn with great heat and be economical.

The valve-stem has thereon an externally threaded portion 41 having threaded connection with the internally threaded portion 42 of the valve-casing. The threads are so arranged that there is a fuel-passage 43 between the stem and casing at the threaded portion which follows the threads. The fuel-passage 43 may be formed by cutting the grooves between the threads in the casing of larger cross-sectional dimensions than the cross-sectional dimensions of the threads on the stem. This fuel-passage is so arranged that when the valve-stem is turned in one direction the rear faces of the external threads will engage the rear faces of the internal threads, and when the valve-stem is turned in the opposite direction, the front faces of the external threads will engage the front walls of the internal threads, transferring the fuel-passage to opposite sides of the threads.

The operation of the valve-stem in opening and closing the valve simultaneously acts to clear the fuel-passage at the threads of any impurities therein, as the rotation of the valve-stem and the relative axial movement between its threads and the threads of the casing act to crush or disintegrate any sediment or impurities in the fuel for causing ready passage thereof through the valve. The rotation of the valve-stem in the fuel-pipe also grinds or crushes any sediment or impurities there may be in the fuel-passage 22, so as to cause ready passage thereof through the valve.

The valve-stem is at the outer end of its threaded portion provided with a reduced portion 47 for forming an annular space 48 between it and the valve-casing for forming a fuel-passage between the fuel-passage along the threads and the valve-seat 31.

When a fuel, such as gasolene or alcohol is being used, the valve-casing is preferably heated by suitable means for vaporizing the fuel prior to its emission from the valve.

The fuel, whether in the form of a gas or spray emitted from my improved valve, is emitted in tubular form owing to the construction and relation of the parts, that is to say, the fuel is emitted as a hollow spray of gas or vapor, the spray in practice tending to spread radially in all directions about a central hollow space 49, as exemplified by the dotted spray lines 50. The fuel being discharged is in practice under pressure, either due to the heat conveyed to the fuel-tank 15 or by other means.

Among the advantages gained by my invention, it may be stated that the forming of the emitted fuel as a hollow spray or tubular formation, increases the area of contact between the emitted fuel and the surrounding air for causing a greater volume of air to mix with a given amount of fuel and to cause an intimate mixture between the gas and air immediately upon discharge of the fuel from the valve. The fuel may be discharged into a suitable mixer into which the air may also be impelled by the action of the discharge, such a mixer being exemplified at the tube 51 which has an inlet opening 52, and a burner-tube suitable for employment in self-heating sad-irons, the burner-tube having burner-orifices 53.

The cylindrical form of the discharge-bore 37 has a tendency to cause the emitting fuel to follow the cylindrical projection of said discharge-bore, the abrupt termination of the regulating shank 32 at the blunt end 36, in conjunction with the form of the discharge bore, preventing the fuel from being drawn toward the axial line of the valve.

Having thus fully described my invention, what I claim as new and desire to secure by Letters Patent, is:

1. A fuel-valve comprising a shut-off valve and a regulating valve having a fuel-passage therebetween, said valves comprising a casing having a valve-seat for said shut-off valve and a cylindrical bore for said regulating valve, and a valve-stem having thereon a valve-closure for said shut-off valve and a regulating shank, said regulating shank comprising a cylindrical portion in said fuel-passage from which cylindrical portion a slightly tapering portion extends outwardly through said cylindrical bore, the proximate ends of said cylindrical portion and slightly tapering portion of said regulating shank being normally at the junction between the outer end of said fuel-passage and the inner end of said cylindrical bore, said slightly tapering portion of said regulating shank terminating in an end face forming a sharp angle with said slightly tapering portion outside said cylindrical bore, and said casing provided with an annular bead received about and extending lengthwise of said casing a greater distance than the distance of projection of said regulating shank outside said bore.

2. In a fuel-valve, the combination of a supply-pipe, a valve at one end thereof, said valve comprising a shut-off valve and a regulating valve having a fuel-passage therebetween, said regulating valve comprising a discharge bore, a regulating shank therein provided with a slightly tapering portion in said cylindrical discharge-bore and an outer end-face having a diameter proximate to the diameter of said regulating shank and forming a sharp angle with said slightly tapering face of said slightly tapering portion, said end-face located outside said bore during discharge of the fuel therefrom, a valve-stem on which said regulating shank is located, said valve-stem extending through the other end of said supply-pipe, and turning means on said valve-stem outside said supply-pipe, the wall of said supply-pipe and said valve-stem having a fuel-passage therebetween communicating with said shut-off valve.

3. In a fuel-valve, the combination of a cylindrical supply-pipe, a valve at one end thereof, said valve comprising a shut-off valve and a regulating valve having a fuel passage therebetween, said regulating valve comprising a discharge-bore and a regulating shank therein, a valve-stem on which said regulating shank is located, turning means on said valve-stem, said cylindrical supply-pipe surrounding said valve-stem and located between said valve and said turning means, the wall of said supply-pipe and said valve-stem having a fuel-passage therebetween communicating with said shut-off valve, said supply-pipe provided with a supply-passage communicating with said fuel-passage at a point distanced from the respective ends of said supply-pipe.

4. In a fuel-valve, the combination of a shut-off valve and a regulating valve having a fuel-passage therebetween, said regulating valve comprising a casing having a cylindrical discharge-bore and a slightly tapering regulating shank received through said bore, said regulating shank terminating in an outer end-face extending across a substantial part of said regulating shank and forming a sharp angle with the slightly tapering face of said slightly tapering regulating shank, and adjusting means for said valves comprising a valve-stem provided with external threads, and coacting internal threads, said external threads and internal threads having their proximate walls spaced apart for forming a fuel-passage communicating with said shut-off valve.

5. In a fuel-valve, the combination of a shut-off valve and a regulating valve having a fuel-passage therebetween, said regulating valve comprising a casing having a discharge-bore and a slightly tapering regulating shank received through said bore, said regulating shank terminating in an end wall of considerable cross-sectional diameter with relation to the diameter of said regulating shank, said end wall forming a sharp angle with said tapering portion, and adjusting means for said valves comprising a valve-stem provided with external threads, and coacting internal threads, said external threads and internal threads having their proximate walls spaced apart for forming a fuel-passage communicating with said shut-off valve, and said valve-stem shiftable for locating said fuel-passage at opposite sides of said threads.

6. In a fuel-valve, the combination of a casing having an outer recess in its end surrounded by an annular bead, and provided with a cylindrical discharge-bore opening into said recess, and a regulating shank having a cylindrical portion and a slightly tapering portion extending from said cylindrical portion and terminating in an end wall forming a sharp angle with said tapering portion, said end wall located outside said cylindrical discharge bore during discharge of fuel through said valve, and the proximate ends of said cylindrical portion and slightly tapering portion meeting at the inner end of said cylindrical discharge-bore with said slightly tapering portion located in and coacting with said cylindrical discharge bore.

In testimony whereof, I have hereunto signed my name in the presence of two subscribing witnesses.

JOHN W. HOBING.

Witnesses:
 EDMUND A. DITTMAN,
 GEORGE S. HAWKE.